(12) United States Patent
Toennessen et al.

(10) Patent No.: US 9,244,186 B2
(45) Date of Patent: Jan. 26, 2016

(54) FORWARD LOOKING SYSTEMS AND METHODS FOR POSITIONING MARINE SEISMIC EQUIPMENT

(75) Inventors: Rune Toennessen, Oslo (NO); Jens Olav Paulsen, Reistad (NO); Kenneth Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 1060 days.

(21) Appl. No.: 12/396,346

(22) Filed: Mar. 2, 2009

(65) Prior Publication Data

US 2009/0161485 A1 Jun. 25, 2009

Related U.S. Application Data

(62) Division of application No. 11/122,646, filed on May 5, 2005.

(51) Int. Cl.
*G01V 1/38* (2006.01)

(52) U.S. Cl.
CPC .................... *G01V 1/3826* (2013.01)

(58) Field of Classification Search
CPC .................................. G01V 1/3826
USPC .................... 367/15, 16, 19, 89–91
See application file for complete search history.

(56) References Cited

U.S. PATENT DOCUMENTS

| | | | |
|---|---|---|---|
| 3,560,912 A | 2/1971 | Spink et al. | 367/106 |
| 3,605,674 A | 9/1971 | Weese | 114/245 |
| 3,630,079 A | 12/1971 | Hughes et al. | 73/178 R |
| 3,774,570 A | 11/1973 | Pearson | 114/245 |
| 3,886,487 A | 5/1975 | Walsh et al. | 367/92 |
| 4,033,278 A * | 7/1977 | Waters | 114/245 |
| 4,104,912 A | 8/1978 | Clavelloux et al. | 73/170.02 |
| 4,138,657 A | 2/1979 | Shave | 367/91 |
| 4,404,664 A | 9/1983 | Zachariadis | 367/19 |
| 4,564,841 A | 1/1986 | Neidell | 342/386 |
| 4,912,682 A | 3/1990 | Norton, Jr. et al. | 367/19 |

(Continued)

FOREIGN PATENT DOCUMENTS

| | | |
|---|---|---|
| EP | 0 613 025 | 8/1994 |
| GB | 2 400 662 | 10/2004 |
| WO | WO 2005/096018 | 10/2005 |

OTHER PUBLICATIONS

Polzin, et al. "The Flnescale Response of Lowered ADCP Velocity Profiles." Journal of Atmospheric and Oceanic Technology, vol. 19, Feb. 2002.*

(Continued)

*Primary Examiner* — Krystine Breier

(57) ABSTRACT

Systems and methods for positioning one or more spread elements of a marine seismic spread are described. One system comprises a seismic vessel-mounted acoustic Doppler current meter adapted to ascertain at least the horizontal component of the current velocity vector at a point ahead of the seismic vessel, and one or more controllers adapted to use the ascertained current velocity vector to control position of one or more seismic spread elements. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 CFR 1.72(b).

20 Claims, 7 Drawing Sheets

(56) References Cited

U.S. PATENT DOCUMENTS

| | | | | |
|---|---|---|---|---|
| 4,935,906 | A | | 6/1990 | Baker et al. .................. 367/111 |
| 5,050,133 | A | * | 9/1991 | Buddery ........................ 367/91 |
| 5,142,505 | A | | 8/1992 | Peynaud ...................... 367/103 |
| 5,443,027 | A | | 8/1995 | Owsley et al. ............... 114/244 |
| 5,675,552 | A | | 10/1997 | Hicks et al. ................. 367/103 |
| 5,694,372 | A | | 12/1997 | Perennes ........................ 367/91 |
| 6,229,761 | B1 | | 5/2001 | Korolenko et al. ............ 367/91 |
| 6,453,256 | B1 | | 9/2002 | Gordon et al. ................ 702/85 |
| 6,525,992 | B1 | | 2/2003 | Olivier et al. ................. 367/17 |
| 6,590,831 | B1 | | 7/2003 | Bennett et al. ................ 367/16 |
| 6,618,321 | B2 | | 9/2003 | Brunet ............................ 367/19 |
| 6,671,223 | B2 | | 12/2003 | Bittleston ....................... 367/19 |
| 6,700,834 | B2 | | 3/2004 | Brumley ........................ 367/90 |
| 6,820,008 | B1 | | 11/2004 | van Smirren et al. ............ 702/2 |
| 2003/0012083 | A1 | | 1/2003 | Brunet ............................ 367/19 |
| 2004/0100867 | A1 | | 5/2004 | Brunet ............................ 367/89 |

OTHER PUBLICATIONS

Wewetzer, et al. "Acoustic Doppler current profiler measurments in coastal and estuarine environments: examples the the Tay Estuary, Scotland." Geomorphology 29 (1999).*

Marmorino, (Journal of Atmospheric and Oceanic Technology, vol. 16).*

Polzin (Journal of Atmospheric and Oceanic Technology, vol. 19, 2002).*

Marmorino (Journal of Atmospheric and Oceanuc Technology, vol. 16).*

Polzin (Journal of Atmospheric and Oceanic Technology, vol. 19).*

Cochrane (Minister of Supply and Services Canada, 1987).*

DTIC, (n.d.). Optimal diversity reception for ship relative global positioning system (srgps). Retrieved Mar. 28, 2005, from DTIC Website: http://www.dtic.mil/matris/sbir/sbir012/sba385.html.

Navsys Corporation, (2005). Internav—modular gps/inertial software. Retrieved Mar. 28, 2005, from Navsys Website: http://www.navsys.com/Products/internav.htm.

RD Instruments, (2001). Rdi goes horizontal at oi2001. Retrieved Dec. 21, 2004, from Company News Web site: http://www.rdinstruments.com/pressrel/pr032101.html.

RD Instruments, (2003), Real-time surface currents for drill ships Retrieved Dec. 21, 2004, from Company News Website: http://www.rdingstruments.com/pressrel/pr051903.html.

Sarnicola Simulation Systems, Inc., (2000). Hexad—2000E. Retrieved Jan. 4, 2005, from Sarnicola Simulation Systems Website: http://www.sarnicola.com/sim3.htm.

Sarnicola Simulation Systems, Inc., (2004). Application notes for the hexad 3000H six degree-of-freedom motion platform. 6th ed. Conklin, NY: Sarnicola Simulation Systems, Inc.

Cochrane et al, "Motion Compensation for a Shipboard Doppler Current Profiler, Considerations and Implementation", Physical & Chemical Sciences, Dept. of Fisheries and Oceans, Bedford Institute of Oceanography, Dartmouth, Nova Scotia, Canada (1987).

UK Search Report dated Sep. 12, 2006, for Application No. GB 0610413.7.

Marmorino, et al., Notes and Correspondence: Near-Surface Current Measurements Using a Ship-Deployed "Horizontal" ADCP, Journal of Atmospheric and Oceanic Technology, Oct. 1999, pp. 1456-1463, vol. 16.

* cited by examiner

FORWARD LOOKING SYSTEMS AND METHODS FOR POSITIONING MARINE SEISMIC EQUIPMENT

CROSS REFERENCE TO RELATED APPLICATION

This is a divisional of co-pending application Ser. No. 11/122,646, entitled "Forward Looking Systems and Methods for Positioning Marine Seismic Equipment" and filed May 5, 2005, in the name of the inventor Rune Toennessen, which is now pending. Accordingly, the earlier effective filing date of this application is hereby claimed under 35 U.S.C §120. This application is also hereby incorporate by reference in full and for all purposes as if set forth verbatim herein.

BACKGROUND OF THE INVENTION

1. Field of Invention

The present invention relates to the field of marine seismic instrumentation and methods of using same. More specifically, the invention relates to systems and methods for positioning one or more spread elements of a marine seismic spread using information about the ocean current ahead of the towing vessel.

2. Related Art

Marine seismic exploration investigates and maps the structure and character of subsurface geological formations underlying a body of water. For large survey areas, seismic vessels tow one or more seismic sources and multiple seismic streamer cables through the water. The entire system is typically referred to as a spread, and the elements making up the spread are referred to as spread elements. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

While there have been some efforts to use information regarding environmental conditions, including ocean currents, previous attempts have not provided the desired precision in positioning marine seismic spread elements.

SUMMARY OF THE INVENTION

In accordance with the present invention, systems and methods are described for positioning one or more marine seismic spread elements, which may include a towing vessel, seismic source, and streamers. The systems and methods of the invention, which employ vessel-mounted acoustic Doppler current meters, reduce or overcome problems with previous systems and methods employing acoustic Doppler current meters. Systems and methods of the invention may be used during seismic data collection, including 3-D and 4-D seismic surveying.

A first aspect of the invention are systems comprising:
 (a) a marine seismic spread, the spread comprising spread elements including a vessel-mounted acoustic Doppler current meter adapted to measure at least a horizontal component of a current velocity vector at least at one location generally ahead of the seismic spread elements; and
 (b) a controller adapted to use at least the horizontal component of the measured current velocity vector to control position of a seismic spread element.

The controller may control position either before the spread element encounters the measured current ahead of the vessel, or when the spread element passes by the point or location where the current was measured. Systems of the invention may include a seismic spread comprising one or more vessels such as towing vessels, a chase vessel, a work vessel, one or more a seismic sources, and one or more seismic streamers towed by towing vessels. The streamers and sources may be separately towed or towed by the same vessel. The acoustic Doppler current meter may be mounted on a chase vessel, a work vessel, an AUV, or a tow vessel, as long as it is able to provide the desired data, and may comprise a transducer that produces at least one beam that is horizontal and forward looking, or has a useable forward-looking horizontal component, and may be adapted to measure a current velocity vector at a point ahead of the towing vessel. The controller may control position of all or some of the spread elements through commands given to spread control elements, such as deflectors, steerable birds, and the like. Optionally, the vessel-mounted acoustic Doppler current meter may be motion-compensated, as explained more fully herein.

As used herein the phrases "passes by the location" and "passes by the point" mean that the spread element need not actually pass through the location or point, but that the spread element in question may be smartly positioned relative to the location or point as the spread approaches or moves away from the location or point. "Location" is meant to be a broader term than "point", which implies a specific spatial coordinate; by location we mean a set of (or range of) coordinates that a point may be within. Both points and locations may be in an arc defined by a specific distance in a direction generally ahead of the vessel and at a specific depth. An exact description of where the current measurement applies is not required. In general, the controller may implement control commands based on what the horizontal current measurement system reports as the current the spread elements will encounter. Although there may be some degree of error in the reported current due to a variety of error sources, including errors in the model of current in space and time, and instrument measurement error, even with the errors, the spread elements may be better controlled with the horizontal current measurement input the majority of the time. Systems and methods of the invention may also be used to estimate variation in current velocity in a vertical plane that is a defined distance from and generally ahead of the vessel.

The current velocity vector may be one of a plurality of parameters used to control position of the spread element or elements. The acoustic Doppler current meter may be mounted near a front of the vessel, near a center of gravity of the vessel, or some other location, as long as the transducers producing the acoustic beams are allowed to travel forward of the vessel and in the water at least a substantial amount of time. The meter may comprise one, two, three, or more than three acoustic transducers producing acoustic "beams". Two or three measurements offset by just enough in space to give a non-singular estimate of a 2D or 3D current will suffice. In embodiments using one acoustic beam, the beam may be transmitted first in one direction, then a second direction, and switched back and forth in high frequency and used to calculate a 2D current velocity vector at an average point or location between the two directions. If the meter produces more than two acoustic beams, two beams may be used to calculate a 2D current velocity vector at an average point or location between the two selected beams, while the third and perhaps other beams may be used for quality control and/or improvement of the current vector estimation. Alternatively, three non-coplanar beams may be used to calculate a 3D current velocity vector. The measured current field may be all around a triangle formed by the three beams, unless the beam lengths are extremely long. Mathematical techniques, for example those described herein, may be used to calculate current velocity vector at specific points ahead of the vessel.

Systems and methods of the invention may optionally be used in conjunction with other systems and methods. For example, since the position of spread elements is known from acoustic ranging networks, GPS, and other position sensors, and since the seismic team knows the paths the spread elements are supposed to follow based on the survey specifications, the controller may use at least the horizontal current velocity vector component to calculate an optimum track for a spread element, either to steer it back to the survey-specified path, or ensure that the survey-specified path is adhered to.

The acoustic Doppler current meter may be motion-compensated by including a motion compensation sub-system. The motion compensation sub-system functions to correct for expected and unexpected movements of the seismic vessel, such as heave, pitch, and roll. The motion compensation sub-system may be mechanical, computational, and combinations thereof. As non-limiting examples, the motion compensation sub-system may be a gimbaling system, a beam weighting system, a motion filtering system, an orientation controller, a local heave compensation system, and combinations thereof, as will become evident.

Another aspect of the invention comprises methods of measuring at least a horizontal component of a current velocity vector at least at one location generally ahead of the seismic spread elements using a vessel-mounted acoustic Doppler current meter, and using at least the horizontal component of the current velocity vector to control position of a seismic spread element before the spread element passes by the location.

Methods of the invention may comprise towing a seismic spread comprising a towing vessel, a seismic source, and optionally a plurality of seismic streamers, which may be towed in over/under configuration, "V" configuration, "W" configuration, or some other configuration; measuring a current velocity vector at a point ahead of the towing vessel using a horizontal acoustic Doppler current meter mounted on the towing vessel; adjusting the meter to compensate for motion of the towing vessel while measuring the current velocity vector to form a motion-compensated current velocity vector; and controlling position of the towing vessel, the seismic source, and the plurality of seismic streamers before they pass by the point using the motion-compensated current velocity vector.

Another aspect of the invention is a method comprising:
  (a) creating a current profile between an acoustic Doppler current meter mounted on a vessel and a point or location distant from the meter and generally in front of seismic spread elements during a time period, the vessel moving generally toward the point or location during the time period; and
  (b) continuously estimating a current velocity vector at the point or location during the time period using the current profile.

Another method of the invention comprises estimating a vertical current profile at a predefined distance ahead of a spread element by using a vessel-mounted acoustic Doppler current meter mounted in a mounting and sampling current vertical component data at a defined rate, the mounting either fixing the meter in a single position relative to the vessel or enabling at least the acoustic beam transmitter or transmitters (sometimes referred to herein as "eyes") to move relative to the vessel, the data sampling rate being at a frequency higher than a frequency of movement of meter or the beam transmitter. If a fixed position mounting is used, the meter will be useful when the vessel pitches. If the vessel is riding in a calm body of water, a pitching motion may be enforced. A mounting having a combination of features may be used, wherein the meter may be locked in a fixed position when the vessel is pitching, and when the seas are calm the locking mechanism released and a controlled pitching motion imposed, for example using a sensor/controller/actuator arrangement. During a pitch cycle the aiming point will the scan through the vertical water column with a depth variation determined by the pitch amplitudes and the distance ahead. The spread elements are located at different depths with the vessel from 0 to maximum draft of the vessel, and the source generally shallower than the streamers, which again are deeper than the vessel, and particularly in over-under streamer configuration and during handling when the streamers are stacked on top of each other. Knowing that the current often changes both in strength and direction in the water column, and in particular close (within 10's of meters) to the sea surface, then it is clear that a good picture of the vertical water column may be helpful for controlling the positioning of the spread elements accurately.

Systems and methods of the invention will become more apparent upon review of the brief description of the drawings, the detailed description, and the claims that follow.

BRIEF DESCRIPTION OF THE DRAWINGS

The manner in which the objectives of the invention and other desirable characteristics can be obtained is explained in the following description and attached drawings in which.

Figure 1:
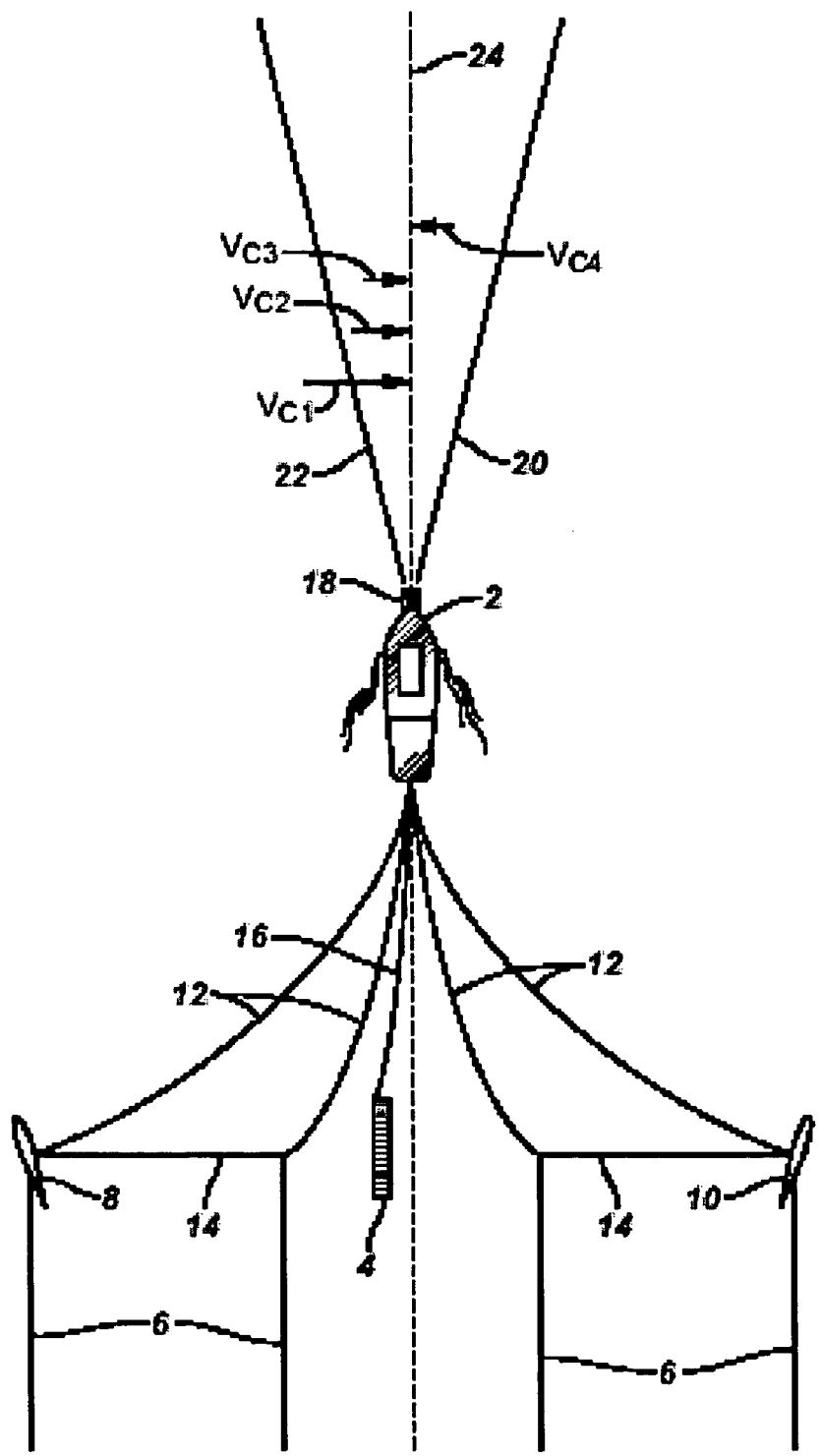
FIG. 1 is a plan or overhead view of a first system of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, in the discussion herein, aspects of the invention are developed within the general context of controlled positioning of seismic spread elements, which may employ computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced in whole or in part with other computer system configurations, including hand-held devices, personal digital assistants, multiprocessor systems, microprocessor-based or programmable electronics, network PCs, minicomputers, mainframe computers, and the like. In a distributed computer environment, program modules may be located in both local and remote memory storage devices. It is noted, however, that modification to the systems and methods described herein may well be made without deviating from the scope of the present invention. Moreover, although developed within the context of controlling position of seismic spread elements, those skilled in the art will appreciate, from the discussion to follow, that the principles of the invention may well be applied to other aspects of seismic data acquisition. Thus, the systems and method described below are but illustrative implementations of a broader inventive concept.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention relates to various systems and methods for controlling position of one or more marine seismic spread elements. One aspect of the present invention relates to systems including a vessel-mounted acoustic Doppler current meter. Another aspect of the invention comprises methods of using a system of the invention to measure at least the horizontal component of a current velocity vector at least at one location generally ahead of a seismic spread element using a vessel-mounted acoustic Doppler current meter, and using at least the horizontal component of the current velocity vector to control position of a seismic spread element before the spread element passes by the location.

The phrase "acoustic Doppler current meter", or ADCM, means a device capable of transmitting two or more high frequency acoustic beams in different directions (or switching one beam between two directions at a given frequency) and generally at an angle to each other, and that is capable of receiving acoustic echoes from particles in the paths of the beams in order to calculate the velocity of a fluid at a point or location of interest that is an average distance between the beams. A "horizontal acoustic Doppler current meter", or H-ADCM, means an ADCM that is capable of transmitting at least two acoustic beams in a horizontal plane (or switching one beam between two directions) and receiving acoustic echoes in that plane. The phrase "acoustic Doppler current profiler", or ADCP, means an ADCM that calculates velocity vectors between a plurality of cells pairs of the beams.

The phrase "current profile" means a plurality of current velocity vectors calculated between cell pairs of two acoustic beams emitted by an ADCP.

The term "vessel-mounted" means any device or component that is at least temporarily attached to a vessel, wherein the vessel may be either the seismic tow vessel, a chase vessel, a work vessel, an ROV, and the like.

The term "spread" and the phrase "seismic spread" are used interchangeably herein and mean the total number of components, including vessels, vehicles, and towed objects including cables, that are used together to conduct a marine seismic data acquisition survey.

The term "control", used as a transitive verb, means to verify or regulate by comparing with a standard or desired value. Control may be open loop, closed loop, feedback, feed-forward, cascade, adaptive, heuristic and combinations thereof.

The term "controller" means a device at least capable of accepting input from sensors and meters (including an ADCM) in real time or near-real time, and sending commands directly to spread control elements, and/or to local devices associated with spread control elements able to accept commands. A controller may also be capable of accepting input from human operators; accessing databases, such as relational databases; sending data to accessing data in databases, data warehouses or data marts; and sending information to and accepting input from a display device readable by a human. A controller may also interface with or have integrated therewith one or more software application modules, and may supervise interaction between databases and one or more software application modules.

The phrase "spread control element" means a spread component that is controllable and is capable of causing a spread component to change coordinates, either vertically, horizontally, or both, and may or may not be remotely controlled.

The terms "control position", "position controllable", "remotely controlling position" and "steering" are generally used interchangeably herein, although it will be recognized by those of skill in the art that "steering" usually refers to following a defined path, while "control position", "position controllable", and "remotely controlling position" could mean steering, but also could mean merely maintaining position, for example when current hits an element. In the context of the present invention, "control position" means we use at least the horizontal component of current ahead of the seismic spread elements in order to give steering commands to steering elements in order for them to return to a desired pre-defined path, or to be able to maintain present position when the new current hits the steering elements. The current data may also be used to calculate a preferred path of for instance the vessel that, with a minimum discrepancy relative to the desired pre-defined path, brings the seismic elements back without conflicting the steering limitations by the system. As "position controllable" and "control position" are somewhat broader terms than "steering", these terms are used herein, except when specific instances demand using more specific words.

"Real-time" means dataflow that occurs without any delay added beyond the minimum required for generation of the dataflow components. It implies that there is no major gap between the storage of information in the dataflow and the retrieval of that information. There may be a further requirement that the dataflow components are generated sufficiently rapidly to allow control decisions using them to be made sufficiently early to be effective. "Near-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after the next process in the decision line receives them.

The term "position", when used as a noun, is broader than "depth" or lateral (horizontal) movement alone, and is intended to be synonymous with "spatial relation." Thus "vertical position" includes depth, but also distance from the seabed or distance above or below a submerged or semi-submerged object, or an object having portions submerged. When used as a verb, "position" means cause to be in a desired place, state, or spatial relation.

The term "adjusting" means changing one or more parameters or characteristics in real-time or near-real-time. The phrase "adjusting the meter" includes one or both of changing position of the meter and correcting the data gathered by the meter to compensate for motion of the vessel to which it is mounted while measuring a current velocity vector to form a motion-compensated current velocity vector using an ADCP-type current meter.

FIG. 1 is a plan or overhead view of a first system of the invention, illustrating a seismic towing vessel 2 pulling a seismic source 4 as well as four seismic streamers, 6. In the arrangement illustrated, which is but one of a great variety within the invention, seismic streamers 6 are pulled laterally by deflectors 8 and 10, which may be of the type known under the trade designation MONOWING™, available from WesternGeco, LLC, Houston, Tex. It is understood that source 4 and seismic streamers 6 are towed at some depth below the water surface. Sources are typically towed at depths ranging from 0 to 10 meters, while seismic streamers may be towed at multiple depths, but are typically at depths ranging form 3 to 50 meters, depending on the survey specifications. The four seismic streamers 6 are illustrated in FIG. 1 towed by respective four tow members 12 as indicated, with separation members 14 provided between adjacent seismic streamers. Passive or active tow members (not shown) may connect source 4 with one or more seismic streamer tow members 12. One or more seismic streamers 6 may have a companion seismic streamer 6' (not illustrated) where the companions are towed in over/under fashion. The vertical distance between seismic streamers 6, 6' in a seismic streamer pair may range from 1 meter to 50 meters, and may be about 5 meters. From hereon we discuss seismic streamers all positioned at the same vertical position, it being understood that the principles of the invention are applicable to over-under streamer arrangements. A selected number of hydrophones, either mounted within the seismic streamer or in/on equipment mounted onto the seismic streamer, may be used as receivers in an acoustic ranging system and thereby provide knowledge of the horizontal and vertical position of seismic streamers 6.

Figure 2:
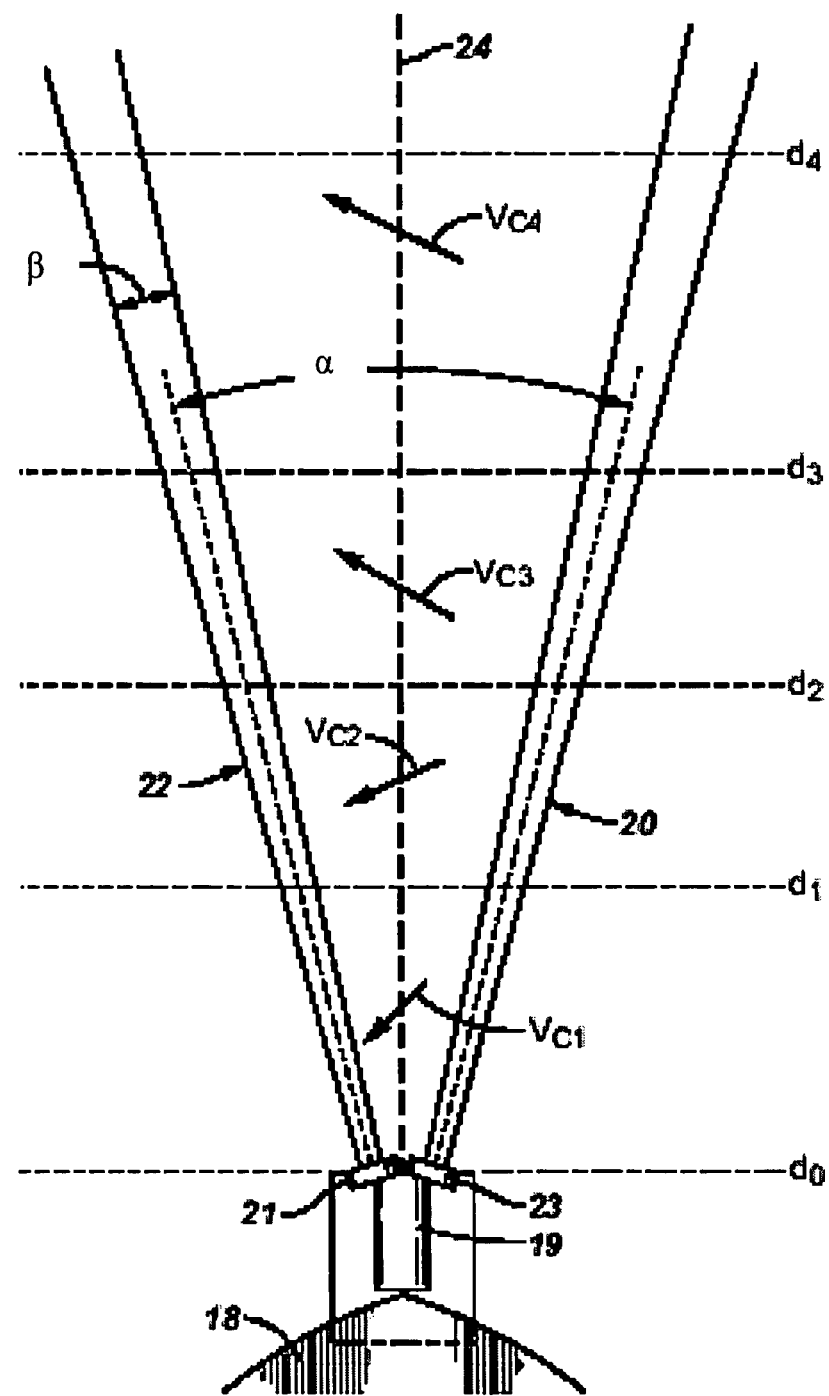
FIG. 2 is a schematic plan view, with portions cut away, of the acoustic Doppler current meter used in FIG. 1.

Attached to towing vessel 2 is a housing 18 for one vessel-mounted acoustic Doppler current meter useful in the invention, illustrated in more detail in FIG. 2. The ADCM in this embodiment transmits two acoustic signals, or beams, indicated by lines 20 and 22, which may be equally spaced from a centerline 24. Also illustrated are four current velocity vectors $V_{C1}$, $V_{C2}$, $V_{C3}$, and $V_{C4}$, represented by respective arrows, where the length of the arrow indicates the magnitude (speed of the current) and the direction of the arrow indicates the general direction of the current in the vicinity of the arrow.

Note that FIG. 1 illustrates a situation wherein the current is faster close to vessel 2, decreases from $V_{C1}$ to $V_{C2}$, and again from $V_{C2}$ to $V_{C3}$, and then actually changes direction at $V_{C4}$. This information is of course useful in positioning spread elements.

FIG. 2 is a schematic plan view, with portions cut away, of the ADCM used in FIG. 1, showing a body element 19 that may contain electronics and processing equipment, and in FIG. 2, two transducer elements arranged in horizontal or near-horizontal fashion. Transducers 21, 23 of the ADCM each produce acoustic beams 22 and 20, respectively, having an angle $\alpha$ between them ranging from about 5 to about 30 degrees. The acoustic beams will also spread to give a larger footprint with increased distance, as indicated by angle $\beta$, which may range from about 0 to 5 degrees. When using a single beam switching back and forth between two directions, or two or more beams in a horizontal plane, the device is sometimes referred to as an H-ADCM. In any case, transducers 21 and 23 send out high frequency acoustic signals, receive echoes, and record Doppler shifts returned from different cells along the beams. Meters of this type are a sub-set of a larger group of current meters known as ADCMs, and those having two beams pointing with an angle between them are capable of constructing a water velocity vector in the plane of these two beams. The beams are divided into elements or so-called cells. Data are returned from each cell and from this data the water velocity vectors may be calculated from each cell pair along the beam. A current vector is calculated at an average position between the beams of each cell. ADCMs that return values from more than one cell pair on each sampling are referred to as "current profilers" or simply "profilers" as they calculate the current vectors from the head of the device and to a predefined set point or location ahead. The profile may be used for quality control purposes, for example, to improve the accuracy of the current velocity recorded at the desired point or location ahead of the vessel as the vessel moves forward. To be more specific, as the vessel moves forward the water velocity at a point or location in space located between the ADCM and the specified point furthest ahead may be continuously estimated with an increased accuracy based on the continuously increased number of measurement samples of the point in space as the vessel moves ahead. Many ADCMs are constructed with three or more beams. If at least three of these beams are out of plane, the ADCM is capable of constructing a 3D water velocity vector. If there are more than three beams, or all beams are in one plane, then the extra beam(s) may be used to improve the accuracy of the result. In this invention, ADCMs whose beams are in plane are denoted as 2D-ADCMs, and ADCMs whose three or more beams are out of plane are referred to as 3D-ADCMs. Both 2D-ADCMs and 3D-ADCMs may be an H-ADCM.

FIG. 2 illustrates a 2D-ADCM, with beams 20 and 22 divided into cells indicated by the dashed lines. In other words, a cell pair is formed between lines $d_0$ and $d_1$, between lines $d_1$ and $d_2$, between lines $d_2$ and $d_3$, and between $d_3$ and $d_4$, and a corresponding current vector calculated for a position midway between beams of the cells, as indicated by the arrows in FIG. 2. It will be understood that these lines are imaginary and the placement of the lines and definition of the cells will necessarily vary with the transducers, electronics, and computational power available.

Figure 3:
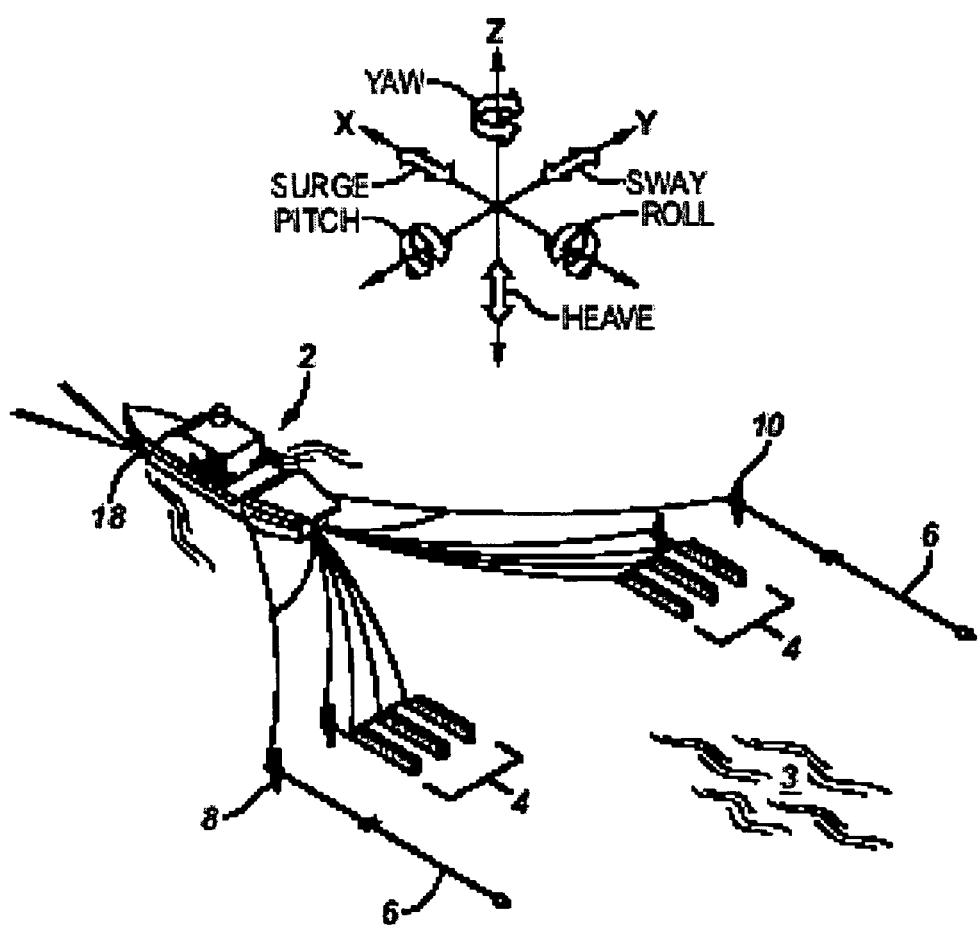
FIG. 3 is a schematic perspective view of a system of the invention and also showing the six possible movements of the towing vessel in the X-Y-Z coordinate system.

FIG. 3 is a schematic perspective view of a system of the invention and also showing the six possible movements of the towing vessel in the X-Y-Z coordinate system. There is a challenge when it comes to acquiring reliable current velocity data from the predefined point or location ahead of the vessel when the current meter, such as an ADCM or H-ADCM, is mounted on the vessel. In particular, the actual motion of the vessel (and sources, streamers, and all other equipment) may be any combination of the motions illustrated on the X-Y-Z coordinates in FIG. 3. By convention in the marine seismic industry, the X direction is generally used to denote the direction of travel of the towing vessel, and FIG. 3 illustrates towing vessel 2 having a vessel-mounted acoustic Doppler current meter 18 attached thereto. The embodiment of FIG. 3 depicts a dual source arrangement, in other words two seismic sources 4 are used. The vessel is actually moving with six degrees of freedom, where three are linear (surge, sway, and heave) and three are rotational (roll, pitch and yaw). Since the current ahead of the vessel is important, regardless of where the current meter is pointing, it may not be necessary to compensate for all six degrees of freedom. For example, in many embodiments it may not be necessary to compensate for sway motion, and in most cases surge and yaw motions. However, the vessel's average forward speed must be compensated for, and even unsteady surge motion in waves may sometimes be noticeable. Crab, a wind driven steady state yaw motion, may be corrected for in order to measure the current in the direction of the bearing rather than in the direction the vessel is pointing. Also yaw may in certain sea conditions be noticeable and may be corrected for. When the vessel is heaving, the ADCM, unless mechanically motion-compensated for in accordance with some embodiments of the present invention, will move up and down with the vessel and it will move up and down relative to the pre-specified target depth where current data is desired. The local heave motion is minimum at or close to the center or gravity (COG) of vessel 2. The local heave motion is usually largest at the bow of the vessel due to the coupling with the pitch motion. Local heave increases also at positions offset to the centerline due to coupling with roll. All this means that the local heave motion is dependent on where the ADCM is mounted on the vessel.

Pitch may also be problematic, especially with a long-range horizontal-looking ADCM. If the vessel is pitching only 2 degrees, and the ADCM is rigidly mounted to the vessel, and the target point is 200 meters ahead of the ADCM, then the ADCM aim point will oscillate about the target depth with a depth variation of +/−7 meters. And this is due to pitch only. In certain methods and systems in accordance with the present invention the ability to sample current data and filter it so as to acquire the data for the targeted depth is provided for. Another complicating factor is the fact that, unless motion-compensated for, the beams will hit the sea surface when the vessel pitches nose up and when large waves are passing by. As seen in FIG. 1, in a two beam ADCM the beams are angled with an angle between them. This means that when rolling, one beam will point upwards and the other will point downwards. That again means that the beams may collect data at different water layers, and hence when combining the data from the two beams to construct a vector, this will not represent the water velocity vector at the mean water depth, particularly not if there is a significant vertical current gradient as is often the case.

Figure 4A:
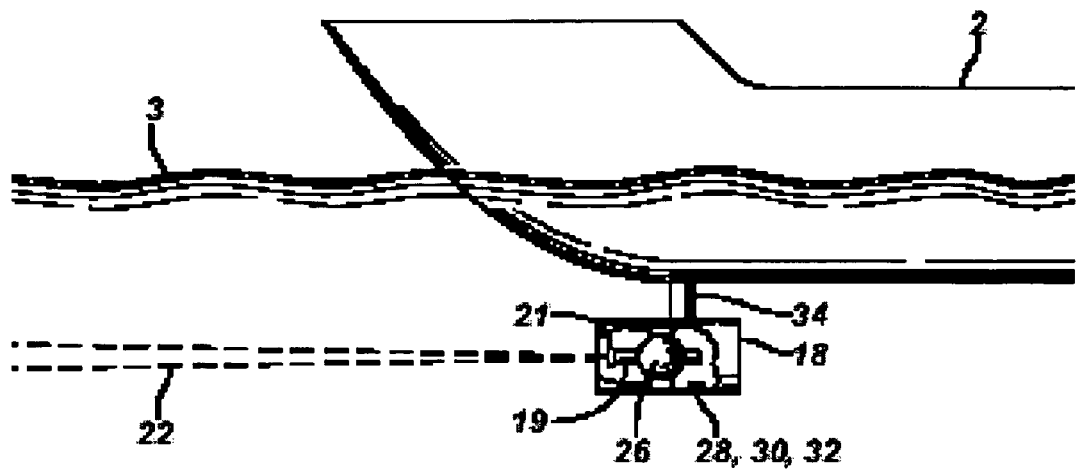
FIGS. 4A and 4B illustrate schematic side elevation views, with portions cut away, of one embodiment of a vessel-mounted, motion-compensated current meter.
Figure 4B:
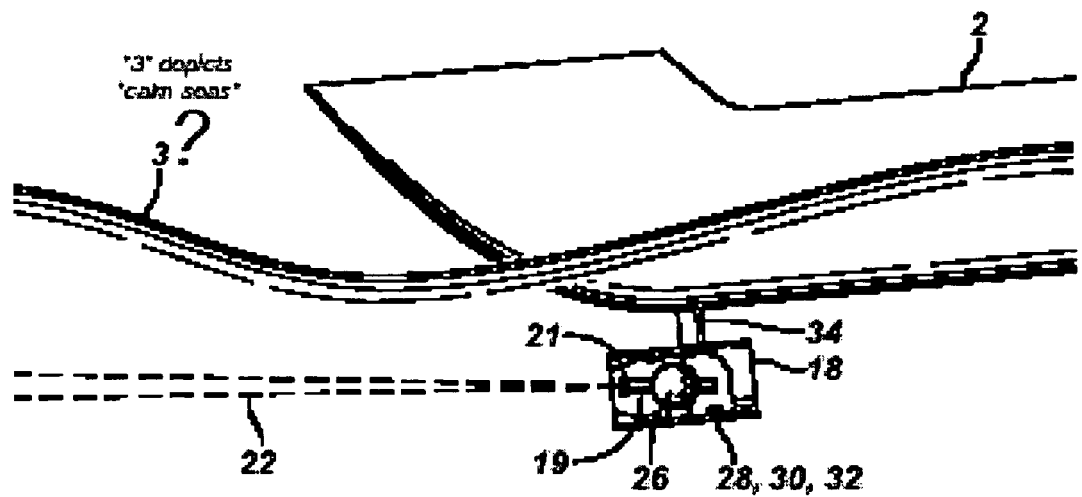

The present invention contemplates several system and method embodiments including motion compensation to deal with the above problems. We now describe several motion compensation options, which may be combined if desirable. One embodiment comprises gimbaling to compensate for rotational motions, and is described in reference to FIGS. 4A and 4B. This system and method may be used provided that the Eigen frequencies of the gimbaling mechanism are far outside the range of the frequencies of vessel motions and provided that no other forces such as fluid forces will tilt the ADCM in either direction. To avoid or reduce fluid forces due to ocean current, waves, and the like, the ADCM may be protected from the fluid flow by partially enclosing it in a dome or equivalent partially enclosed body 18 (hereinafter termed a housing) with windows for transducers 21, 23 in the front, as illustrated in FIGS. 4A and 4B. Housing 18, illustrated with portions cut away to reveal the ADCM, 19, 21 inside, may be suspended beneath vessel 2 (housing 18 could be suspended at the hull side or at or on the bulb in front of the bow on vessels having such a bulb) by a connector 34 that may supply necessary power and communications to ADCM body 19 and transducers 21 and 23. Alternatively, the ADCM may receive power via batteries, and may communicate via wireless transmission. Vessel 2 may or may not be the seismic towing vessel. It could, for example, be a chase vessel or work vessel. A gimbaling mechanism is depicted schematically as a ring 26. Optional torque motors 28, 30, and 32 may be used for assisting one or more of the gimbaling movements. FIG. 4A depicts a calm sea 3 and vessel 2 rides near horizontally in the sea, and in this case beam 22 is able to point more or less directly at the target point or location ahead of vessel 2 (not illustrated). This point or location ahead of the vessel may be as far as the ADCM is able to "shoot", but may be about 250 meters with presently known devices. FIG. 4B depicts a pitch down situation, where vessel 2, and thus connector 34 and housing 18, also pitch down due to a rough sea 3a. However, gimbaling mechanism 26, assisted by any motors or other actuators 28, 30, 32, compensates for the vessel's pitch, and beam 22 remains pointed more or less at the target. Note that gimbaling will not be able to compensate for any translational motions such as heave, but if the ADCM is mounted close to the vessel COG the local heave motion may be limited. This system and method may be combined with other motion compensation methods described herein for heave compensation.

Gimbaling is a mechanical solution. Motion compensation may also be performed through beam weighting, which is a computational solution. In these methods, the ADCM may employ a 3D-ADCM rigidly attached to the vessel. A 2D-ADCM will calculate a 2D velocity vector at an average position between the two beams. A 3D-ADCM will calculate a 3D velocity vector all around a triangle formed by the three beams, unless the beam lengths are extremely long, in which case the velocity vector is calculated at a location comprised by the center of a triangle bound by at least three beams and the distance ahead as predefined. If the target position is not in the center of this triangle, then interpolation procedures between the beams may be used to estimate the value of the velocity vector offset from the center point. This means that the three beams may be weighted differently. If the target point is outside the triangle bound by the three beams, extrapolation techniques may be employed. Software application programs may be used for these functions. However, even the horizontal and vertical components of the velocity vector at points and locations not at the center of the triangle, or even outside of the triangle, may be useful and better than no knowledge at all.

Figure 5A:
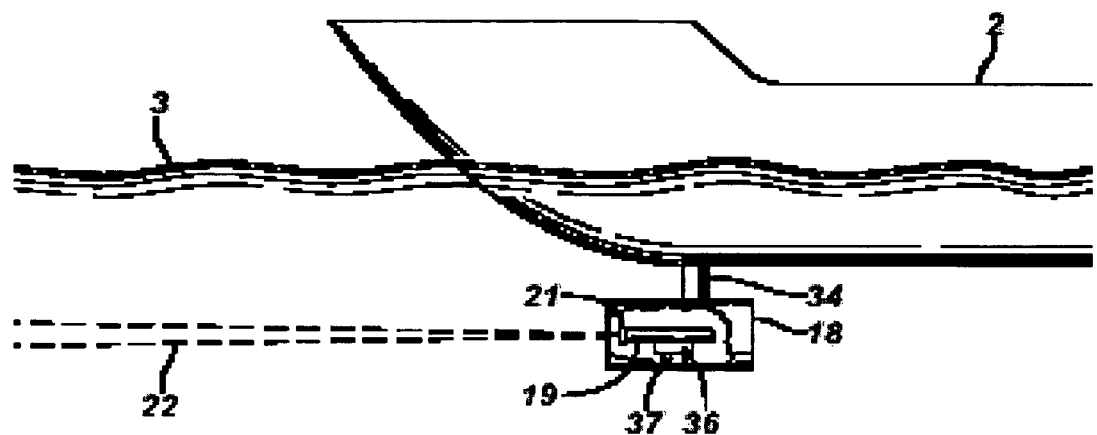
FIGS. 5A and 5B illustrate schematic side elevation views, with portions cut away, of another embodiment of a vessel-mounted, motion-compensated current meter.
Figure 5B:
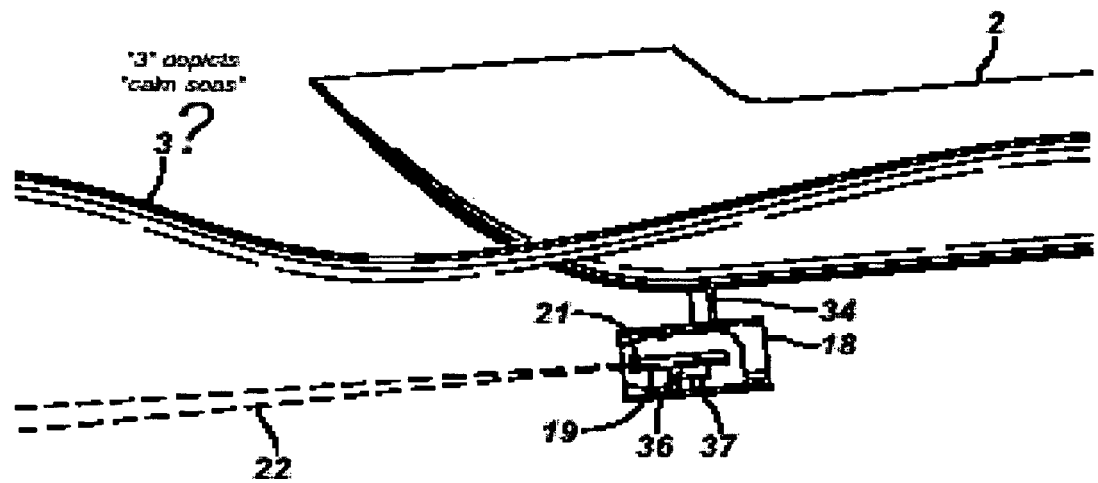

Another computational approach to motion compensation useful in the invention may also be performed by continuous or semi-continuous recording, motion sensing, picking and filtering of the velocity data. In these methods, a 2D, or in-plane ADCM may be rigidly attached to the vessel, as illustrated in FIGS. 5A and 5B. In these methods, the actual motion and orientation of the ADCM is sensed. Utilization of a so-called motion capture system, illustrated at 36 and 37, respectively, may perform this function. The term "motion capture system" is most often used in connection with analysis of motion for sports medicine, and to simulate motion for video games. This type of system can be used for short time periods when the inertial instrument drift doesn't have time to build up and when motion can be calibrated by visiting known points during the motion. As shown in FIGS. 5A and 5B, as opposed to the situation depicted in FIGS. 4A and 4B, when vessel 2 pitches down due to a rough sea 3a, the ADCM 19, 21 also pitches down, and thus acoustic beam 22 more or less follows the pitching motion of vessel 2. The solution in this embodiment is the use of a stationary platform 36 and a motion capture system 37. "Motion capture system" is a general term for an assembly of accelerometers and/or gyroscopes that are able to follow motion in space with time. Motion capture system 37 captures the movements of ADCM, 19, 21. A motion capture system is basically a sensor or collection of sensors, typically optical or magnetic, that are capable of transferring motion data to a controller containing software for data processing, according the specifications of the seismic survey. In addition an instrument may be used to re-set the motion capture system since they tend to drift over time. In the aerospace and maritime industries it is common to combine high precision relative GPS signals between three antennas with a fixed baseline between them with an inexpensive solid-state component inertial system to sense 3D motion. GPS/inertial is an inexpensive and smaller equipment set than typical vessel gyros. The inexpensive inertial units have much higher drift rates than mechanical gyros but the drift is bounded by the high recalibration rate available from GPS. The motion measurement system may be synchronized with the ADCM measurements system and time tagging may be used to link motion events to measurement events. One may use a depth sensor for this, such as a pressure sensor measuring the water depth. Other calibration methods may be used as well and one may utilize the fact that over time the orientation of the ADCM will be level. When the motion and orientation of the ADCM is known, it is then known where the ADCM is pointing. Data is then recorded through the motion cycles and a picker picks the data that corresponds to the ADCM actually pointing at the predefined point or location ahead. Filtering may have to be applied in order to gather smooth data. An advantage with this method is that the vessel's pitch motion may be utilized in order to gather data for a variety of water depths. These methods and systems may also take advantage of using gimbaling in, for example, the roll degree of freedom so as to make it easier to identify instances where the ADCM is actually pointing at the target point and at the same time have both beams leveled to gather data at the same water depth.

Figure 6A:
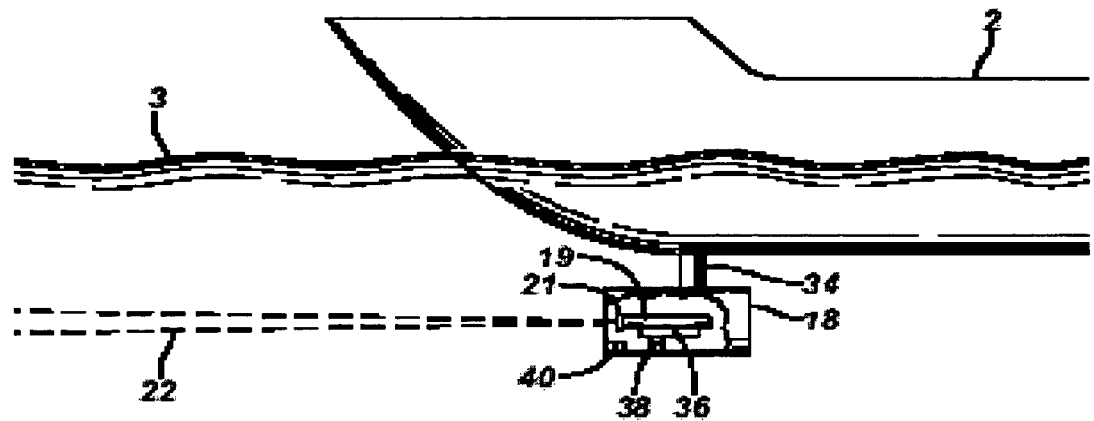
FIGS. 6A and 6B illustrate schematic side elevation views, with portions cut away, of another embodiment of a vessel-mounted, motion-compensated current meter.
Figure 6B:
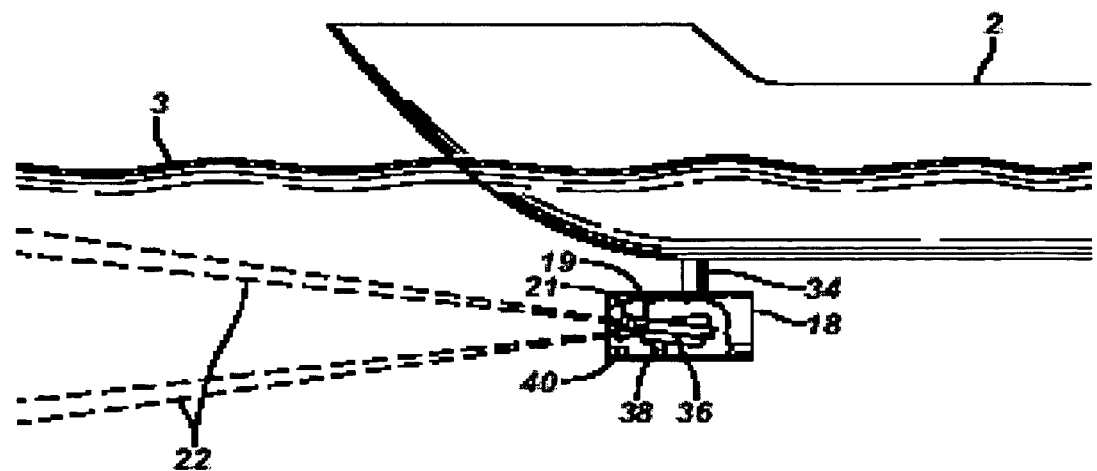

A variation of the previous motion compensation system and method utilizes a moveable platform rather than a fixed platform 36, and this system and method are illustrated in FIGS. 6A and 6B. Instead of just monitoring the motion and the orientation of the ADCM, and leaving the ADCM fixed to the vessel, one may actually actively correct for the motion so that the ADCM always points at the pre-defined target ahead. This system and method utilizes the same motion sensing and calibration system as the system and method just mentioned in reference to FIGS. 5A and 5B. In addition, an active control system comprised of electric or hydraulic actuators controlling at least two motions, for example the pitch and roll of the ADCM, is added in the form of a motion platform. A commercially available hull-mounted motion-compensated acoustic Doppler transducer is available from Reson A/S, Slangerup, Denmark, under the trade designation "SeaBat 8101", with optional pitch stabilization. This option provides the ability for the system processor to receive an external vessel pitch value and in real-time automatically maintain a vertical transmit beam.

Motion platforms are ubiquitous in the computer gaming industry, for example, and in flight simulators and amusement rides; many are home-built. Electric, hydraulic, or pneumatic actuators may drive them. One motion platform useful in the invention may be that described in U.S. Pat. No. 6,027,342. Another may be that disclosed in U.S. Pat. No. RE 27,051, which employs a classic "hexapod" or "Stewart" configuration of six hydraulic legs to provide controlled motion in six degrees of freedom. Modern versions may be controlled by a standard PC-type computer running Microsoft Windows™ and equipped with suitable control software, and may include a local controller connected by a USB connector. The software may be manually or automatically controlled, and may have the ability to store and replay motion profiles, and interface to a supervisory controller for real time or near-real-time control. Depending on the degrees of freedom of motion desired, the motion platform may comprise two, three, four, five, or six hydraulic or electronic actuators, one end of each fixed to a base, the other end fixed to a moveable deck. The base and deck may be of any configuration, such as rectangular, triangular, oval, circular, and the like. By separately controlling the leg extensions of the actuators, the motion platform may produce any combination of surge, sway, heave, yaw, pitch and roll motions. High-bandwidth servo valves may operate the actuators, and a hydraulic pumping unit is included in hydraulic systems. Leg extension may be controlled by servo controllers, and read by linear potentiometers integrated into each leg. The USB interface may allow communication with the supervisory controller, a host computer, or other device.

In one basic configuration, the ADCM may be placed and fixed on a two, three, four, five, or six-degrees-of-freedom motion platform 36. Motion platform 36 may be moved by one or more actuators 38, controlled locally by a local controller 40, or directly by a supervisory controller (not shown), or combination thereof. If desired, local controller 40 or the supervisory controller may send new motion commands to the motion platform, closing one cycle of data-loop. It is not necessary to control for heave as long as one may correct for this with the pitch so as to still aim at the pre-defined point ahead. Local controller 40 may gather information from the operator and motion platform 36, and based on this information give commands to the actuators 38. The system and method of this embodiment may also be configured so that the ADCP continuously scans a vertical water column with controlled pitch motions and thereby continuously record the water velocity in the pre-defined water column of interest. This system has the advantage that, if implemented with control of all rotational degrees of freedom, the aim point may always be hit if the actuators are controlled in an optimum way.

Figure 7:
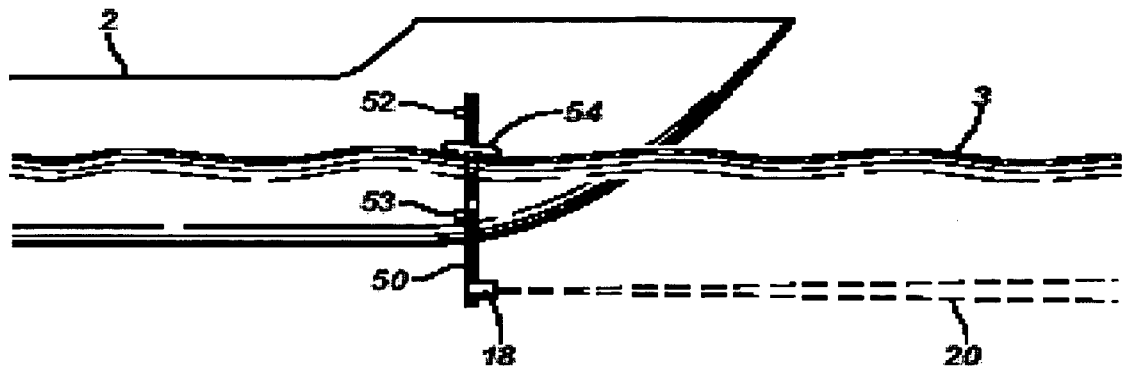
FIG. 7 illustrates a side elevation view of another system of the invention.

FIG. 7 illustrates a side elevation view of another system of the invention, comprising vertical pole 50 mounted somewhere on seismic vessel 2 via brackets 52 and 53. The local heave motion at that location is comprised of both the heave motion of the COG and local heave components derived from pitch and roll. An ADCM 18 is mounted to the pole in such a way that it is allowed to slide up and down the pole and mounted to it is a buoyancy element 54 that rides on the sea surface. Buoyancy element 54 may or may not be connected to pole 50, but if it is it should be a sliding connection in the same manner as for the ADCM. The dynamic system comprised of buoyancy element 54 and ADCM 18 comprises a mass dominated dynamic system so that it should be relatively insensitive to the wave motion. This means that the volume of buoyancy element 54 should be limited and its water plane area should be as small as possible while still being able to sustain an average depth of ADCM 18 without too much oscillation about that average value. If pole 50 pitches with the vessel, ADCM 18 will pitch as well. However a gimbaling system (FIGS. 4A and 4B) may be combined with this system so as to ensure the ADCM beam(s) are always horizontal, or nearly so. This applies for roll as well. Gimbaling the roll motion transmits the beams at the same, or nearly the same water depth.

Figure 8:
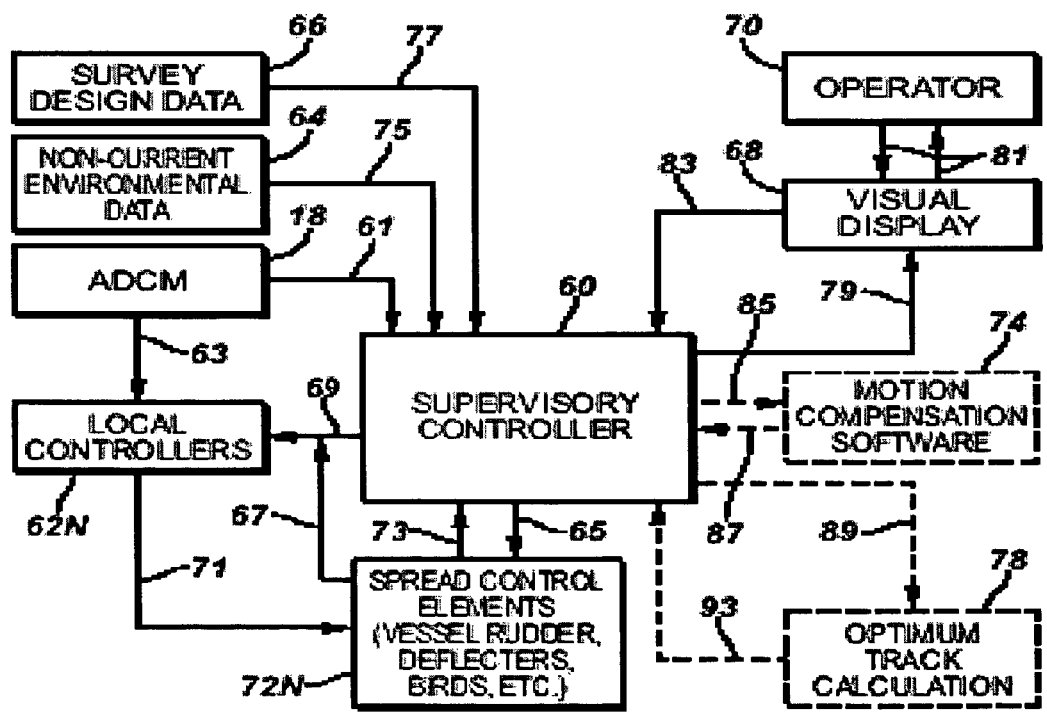
FIG. 8 is a schematic block diagram of a control scheme that may be utilized to control the motion compensation systems and other parameters useful with current meters in the systems of the invention.

FIG. 8 is a schematic block diagram of several control schemes that may be utilized to control vessel motion using a vessel-mounted current meter and information supplied by other sensors, databases, and survey parameters. FIG. 8 represents a few options in control schemes that are useful in practicing the invention, and those of ordinary skill in the art will recognize, after reading this disclosure, that variations abound. As long as the control scheme uses data gathered by a vessel-mounted ADCM or H-ADCM to assist in steering one or more spread elements, the control scheme is considered within the invention. A supervisory controller 60 may receive data 61 from a vessel-mounted ADCM 18; data 75 from a database or other source 64 of non-current environmental data (for example wind data, water salinity data, water temperature, air temperature, and the like); data 77 from a survey design database 66; and manual data 83 or other input from a human operator 70 through a visual display 68 receiving data 79 from supervisory controller 60. Interaction 81 between visual display 68 and human operator 70 may be visual, audio, touch or any other transmission means. Supervisory controller 60 may also receive feedback or status data 73 from one or more spread control elements 72N (vessel rudder, deflectors, steerable birds, and the like). Vessel-mounted ADCM 18 may directly control one or more spread control elements 72N via local controllers 62N as indicated by command lines 63 and 71. In these instances, spread control elements 72N would feedback data to local controllers 62N, and may feedback data 73 to supervisory controller 60. In one option, supervisory controller 60 sends commands 65 directly to spread control elements 72N. In another option, supervisory controller 60 may send master commands 69 to one or more local controllers 62N in cascade control fashion, modifying feedback signals 67 as desired by operator 70 or programmed by supervisory controller 60. If data 61 on current velocity obtained by ADCM 18 is sent to supervisory controller 60, the latter may transmit the raw or modified data 85 to an optional motion compensation software application 74, which may utilize one or more software algorithms, for example interpolation, extrapolation, and the like, and return modified data 87 to supervisory controller 60 for use in controlling one or more spread control elements 72N. Alternatively, optional software application 74 may be locally stored in one or more local controllers 62N. Other options include supervisory controller 60 sending data 89 (which may include some or all of the input data 61, 75, 77, 83 and motion compensation data 87) to a software application 76 for calculating optimum tracks 93 using a software application 78.

In use, systems and methods of the invention are particularly adept for 3D and so-called 4D seismic data acquisition surveys. More specifically, the systems and methods of the invention may be integrated into the seismic towing vessel steering strategy, and may be integrated into positioning strategies for the other spread elements. In time-lapse or so-called 4D seismic, the source and receivers may be positioned to within a few meters of a baseline survey in order to gather a good picture of the evolution of a reservoir over time. The geophysical requirement for the accuracy of the repositioning varies with the geological structure and the expected time-difference signal, but generally a 10 meter positioning discrepancy is allowed, and often a bigger mismatch is allowed due to practicalities regarding the historical repositioning abilities. It is desired to position the source to within 5 meters, and the streamers to within about 10 meters of their previous tracks. Knowing, or at least having a good approximation of, the current ahead of the vessel may be helpful in order to meet these targets as it allows for corrective actions to be taken before it is too late. One use of systems and methods of the invention is to make an approximate positioning by seismic towing vessel steering and to fine tune by positioning the individual spread elements behind the seismic towing vessel, i.e. the source and the streamers, if present. One optional strategy involves manual control combined with closed loop control of the individual steering elements. A second optional strategy involves use of fully integrated, multilayer regulators. In both strategies at least a horizontal component of the current velocity ahead of the vessel is determined or closely approximated using a vessel-mounted ADCM. In the first optional strategy the steering software suggests inputs to the steering elements (vessel, source streamer) based on current, wind, and other external forces. Then it is up to the human operator to judge the sanity of the information that comes in and approve or correct the steering commands. In the second optional strategy, the vessel and the other positionable elements accept the data obtained from the vessel-mounted ADCM about the current, as well as other non-current environmental data, survey design data, and the like, and steer accordingly in order to minimize the re-positioning error.

Systems and methods of the invention may employ any number of spread control elements, which may include one or more orientation members, a device capable of movements that may result in any one or multiple straight line or curved path movements of a spread element in 3-dimensions, such as lateral, vertical up, vertical down, horizontal, and combinations thereof. The terms and phrases "bird", "cable controller", "streamer control device", and like terms and phrases are used interchangeably herein and refer to orientation members having one or more control surfaces attached thereto or a part thereof. A "steerable front-end deflector" (or simply "deflector") such as typically positioned at the front end of selected streamers, and other deflecting members, such as those that may be employed at the front end of seismic sources or source arrays, may function as orientation members in some embodiments, although they are primarily used to pull streamers and steer sources laterally with respect to direction of movement of a tow vessel. Horizontal separation between individual streamers may range from 10 to about 200 meters. In the embodiment of FIG. 1 the horizontal streamer separation may be consistent between one streamer 6 and its nearest neighboring streamers 6. Horizontal and/or vertical control of streamers 6 may be provided by orientation members (not illustrated) which may be of any type as explained herein, such as small hydrofoils or steerable birds that can provide forces in the vertical and/or horizontal planes. One suitable orientation member is the device known under the trade designation Q-FIN™, available from WesternGeco LLC, Houston, Tex., and described in U.S. Pat. No. 6,671,223, describing a steerable bird that is designed to be electrically and mechanically connected in series with a streamer; another suitable device is that known under the trade designation DigiBIRD™, available from Input/Output, Inc., Stafford, Tex. Other streamer positioning devices, such as the devices described in U.S. Pat. Nos. 3,774,570; 3,560,912; 5,443,027;

3,605,674; 4,404,664; 6,525,992 and EP patent publication no. EP 0613025, may be employed.

Current meters in general, including the vessel-mounted current meters useful in the present invention, measure water velocity referring to the vessel fixed coordinate system. In order to extract the current related to the earth fixed coordinate system, supervisory controller 60 in FIG. 8 may have the capability to relate the current velocity measurements obtained in the vessel fixed coordinate system to the earth fixed coordinate system by measuring the current speed over ground by using any kind of positioning system relating to an earth fixed coordinate system. These calculations are well-known and require little further explanation here.

Systems of the invention may communicate with the outside world, which may be the vessel to which it is attached, or another vessel or vehicle, a satellite, a hand-held device, a land-based device, and the like. The way this may be accomplished varies in accordance with the amount of energy the system requires and the amount of energy the system is able to store locally in terms of batteries, fuel cells, and the like. If housing 18 is large enough, batteries, fuels cells, and the like may be housed therein, and wireless communication may be sufficient. Alternatively, or in addition, there may be a hard-wire power connection and a hard wire communications connection to another device, this other device able to communicate via wireless transmission.

In use the systems and methods of the invention may work in feed-forwarded fashion with existing control apparatus and methods to position not only the seismic tow vessel, but seismic sources and streamers. Sources and streamers may be actively controlled by using GPS data or other position detector sensing the position of the streamer (e.g. underwater acoustic network), or other means may sense the orientation of one or more individual streamers (e.g. compass) and feed this data to navigation and control systems. Gross positioning and local movement of spread components may be controlled on board a tow vessel, on some other vessel, locally, or indeed a remote location. By using a communication system, either hardwire or wireless, information regarding current velocity ahead of the vessel may be sent to one or more local controllers, as described herein. The local controllers in turn are operatively connected to spread control elements comprising motors or other motive power means, and actuators and couplers connected to the orientation members (flaps), and, if present, steerable birds, which function to move the spread components as desired. This in turn adjusts the position of the spread element, causing it to move as desired. Feedback control may be achieved using local sensors positioned as appropriate depending on the specific embodiment used, which may inform the local and remote controllers of the position of one or more orientation members, distance between streamers, a position of an actuator, the status of a motor or hydraulic cylinder, the status of a steerable bird, and the like. A computer or human operator can thus access information and control the entire positioning effort, and thus obtain much better control over the seismic data acquisition process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures. Thus, although electronic and hydraulic motion platforms may not be structural equivalents in that an electronic motion platform employs one type of actuator, whereas a hydraulic motion platform employs a different type of actuator, in the environment of motion platforms for motion compensation, electronic and hydraulic motion platforms may be equivalent structures.

What is claimed is:

1. A method comprising:
    measuring at least a horizontal component of a current velocity vector at a location using an acoustic Doppler current meter mounted on a vessel, wherein the location is generally ahead of the vessel and at a depth between the water's surface and the deeper of the acoustic Doppler current meter and the vessel's draft, and wherein the acoustic Doppler current meter comprises an acoustic transducer able to move relative to the vessel; and
    using the measured horizontal component of the current velocity vector to automatically control the position of a seismic spread element.

2. The method of claim 1 wherein the measured horizontal component of the current velocity vector is used in conjunction with a plurality of parameters to control position of the seismic spread element.

3. The method of claim 1 wherein the spread element is a seismic towing vessel.

4. The method of claim 1, wherein using the measured horizontal component of the current velocity vector to automatically control the position of the seismic spread element includes using the measured horizontal component of the current velocity vector to maintain a position of the spread element.

5. The method of claim 4, wherein using the measured horizontal component of the current velocity vector to control the position of the seismic spread element includes using the measured horizontal component of the current velocity vector to steer the spread element to a defined path.

6. The method of claim 1, further comprising motion compensating the acoustic Doppler current meter.

7. The method of claim 6, wherein the motion compensating includes gimbaling, beam weighting, motion filtering, controlling orientation, compensating for local heave, or combinations thereof.

8. A method comprising:
    creating a current profile between an acoustic Doppler current meter mounted on a seismic towing vessel and a point distant from the acoustic Doppler current meter; wherein:
        the acoustic Doppler current meter comprises an acoustic transducer able to move relative to the vessel;
        the vessel is moving generally toward the point during a time period; and
        the point is generally ahead of the seismic towing vessel during the time period and at a depth between the water's surface and the deeper of the acoustic Doppler current meter and the vessel's draft;
    using the current profile to continuously estimate at least a horizontal component of a current velocity vector at the point during the time period; and
    using the estimated horizontal component of the current velocity vector to automatically control the position of a seismic spread element.

9. The method of claim 8, further comprising motion-compensating the acoustic Doppler current meter.

10. The method of claim 8, wherein the continuously estimating comprises continuously calculating the current velocity vector at the point using a plurality of cell pairs between two acoustic beams of the acoustic Doppler current meter.

11. The method of claim 10, wherein the continuously calculating comprises continuously calculating the current velocity vector at the point using at least two high-frequency acoustic beams.

12. The method of claim 11, wherein:
the at least two high-frequency acoustic beams comprises at least three high-frequency acoustic beams;
the acoustic beams are in one plane; and
all but two of the acoustic beams are used for quality control.

13. The method of claim 10, wherein the acoustic Doppler current meter comprises three acoustic beams, two beams in a horizontal plane and a third beam out of the horizontal plane.

14. The method of claim 8, further comprising relating the estimated current velocity vector to an earth-fixed coordinate system by measuring the current velocity over ground using a positioning system relating to an earth-fixed coordinate system.

15. A method comprising:
estimating a vertical current profile using an acoustic Doppler current meter mounted on a vessel, wherein:
the vertical current profile is estimated at a predefined distance ahead of the vessel and at a depth between the water's surface and the deeper of the acoustic Doppler current meter and the vessel's draft;
the acoustic Doppler current meter comprises an acoustic transducer able to move relative to the vessel; and
the acoustic transducer samples current vertical component data at a defined data sampling rate, the data sampling rate being at a frequency higher than a frequency of movement of the acoustic transducer; and
using the sampled current vertical component data to automatically control the position of a seismic spread element.

16. The method of claim 1, wherein the acoustic Doppler current meter is able to move relative to the vessel.

17. The method of claim 1, wherein the acoustic Doppler current meter is locked in a fixed position when the vessel is pitching.

18. The method of claim 1, wherein the acoustic Doppler current meter is attached to a moveable platform and the acoustic Doppler current meter is actively corrected for motions of the vessel.

19. The method of claim 18, wherein the moveable platform comprises electric actuators, hydraulic actuators, or combinations thereof.

20. The method of claim 1, wherein the acoustic Doppler current meter is mounted to a pole attached to a vessel and wherein the acoustic Doppler current meter is able to slide up and down the pole.

* * * * *